United States Patent [19]

Offenbacher

[11] 4,143,497
[45] Mar. 13, 1979

[54] WEATHERSTRIP SEALING ARRANGEMENT

[75] Inventor: Lon A. Offenbacher, Dayton, Ohio

[73] Assignee: General Motors Corporation, Detroit, Mich.

[21] Appl. No.: 820,141

[22] Filed: Jul. 29, 1977

[51] Int. Cl.² .............................................. E04B 1/62
[52] U.S. Cl. ...................................... 52/400; 52/717; 49/490; 49/499
[58] Field of Search ................. 52/716, 717, 718, 400; 49/490, 491, 498, 499, 489

[56] References Cited

U.S. PATENT DOCUMENTS

| | | | |
|---|---|---|---|
| 2,606,635 | 8/1952 | Clingman | 52/716 X |
| 2,700,196 | 1/1955 | Panhard | 52/400 |
| 3,189,143 | 6/1965 | Adams | 52/400 X |
| 3,773,338 | 11/1973 | Fidler et al. | 49/490 X |
| 3,815,303 | 6/1974 | Ziegler | 52/400 X |
| 4,010,573 | 3/1977 | Andrzejewski | 52/716 X |

FOREIGN PATENT DOCUMENTS 710081  5/1965  Canada .......................................... 52/400
511213  1/1955  Italy ............................................ 52/400

Primary Examiner—Ernest R. Purser
Assistant Examiner—Carl D. Friedman
Attorney, Agent, or Firm—John P. Moran

[57] ABSTRACT

The arrangement shown and described herein is used to seal a closure structure of a vehicle body. A weatherstrip including metal strip inserts is extruded to include not only the usual hollow deflection bulb, but also a hollow flange sealing bulb, formed in a predetermined shape on the center portion of the side surface opposite the deflection bulb. When the retention portion of the weatherstrip around the metal strip inserts is crimped to form its operational "U" shaped recess, the flange sealing bulb is located at the bottom of the recess, substantially uniformly filling the space heretofore selectively filled with a bead of butyl mastic sealant. Once the thus formed weatherstrip is installed on a body closure flange or ledge, the edge of the flange or ledge depresses the hollow sealing bulb such that the latter effectively and uniformly seals off the inside of the flange or ledge from the outside thereof.

1 Claim, 3 Drawing Figures

WEATHERSTRIP SEALING ARRANGEMENT

This invention relates generally to vehicle body construction and, more particularly, to a weatherstrip sealing arrangement for closure structures of vehicle bodies.

It is customary to use so-called "pinchweld" weatherstrips which (1) mount on a flange of the vehicle deck under the trunk lid, (2) on the hood ledge just in front of the windshield, and (3) on a flange around each door frame. Current practice generally includes crimping the formed strip to form a retention slot therein, and then applying a bead of suitable butyl mastic in the bottom of the slot prior to mounting the strip on the flange or ledge. In some instances such bead is applied along an outer edge of the strip after it has been mounted on the flange or ledge. While such arrangements are generally satisfactory, it's possible for the mastic sealant to be applied unevenly in the slot and, hence, a leakage therepast may occur.

Accordingly, a general object of the invention is to provide an improved, economical and efficient pinchweld weatherstrip which does not require the separately applied butyl mastic bead.

Another object of the invention is to provide a pinchweld weatherstrip including an integral flange sealing bulb in lieu of the separately applied mastic sealant.

A further object of the invention is to provide a pinchweld weatherstrip wherein a flange sealing bulb is integrally formed thereon in a single extrusion operation.

These and other objects and advantages will become more apparent when reference is made to the accompanying description and drawings, wherein.

Figure 1:
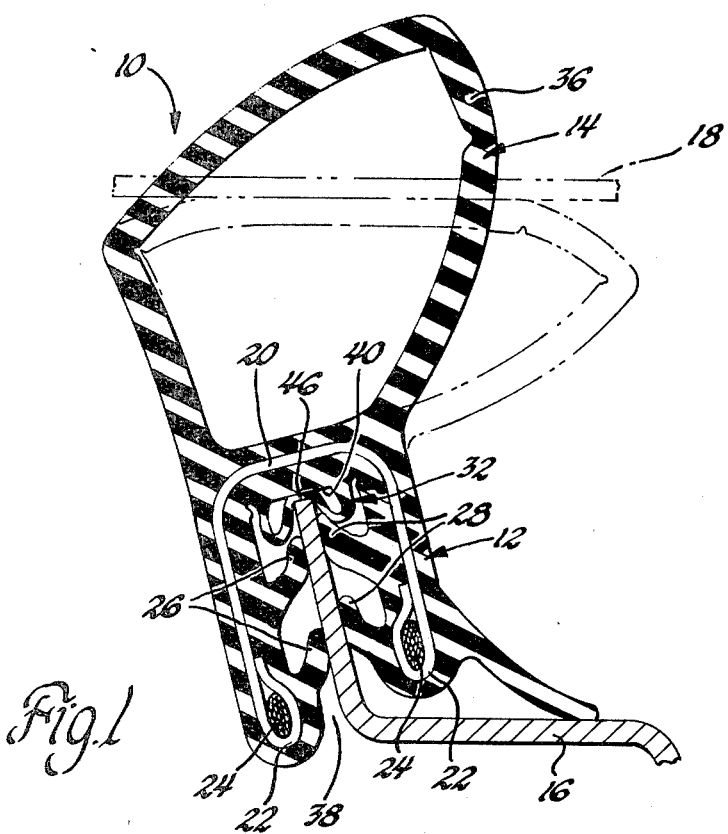
FIG. 1 is a fragmentary cross-sectional view of an automobile closure structure embodying the weatherstrip invention.

Referring now to the drawings in greater detail, FIG. 1 illustrates a pinchweld weatherstrip 10 including generally a retention portion 12 and a deflection portion 14. The retention portion 12 is shown installed on a vehicle body flange portion 16, such as a deck flange, a hood ledge, or a door flange, with the respective cooperating body closure member out of contact therewith, as would be the case any time such closure member were opened.

FIG. 1 also illustrates the pinchweld weatherstrip 10 mounted on the flange portion 16, with the cooperating body closure member 18, such as a trunk lid or hood in its closed condition. In this condition the deflection portion 14 of the weatherstrip 10 serves as an efficient upper sealing member by virtue of being retained against the body closure member 18 in a depressed state.

Figure 2:
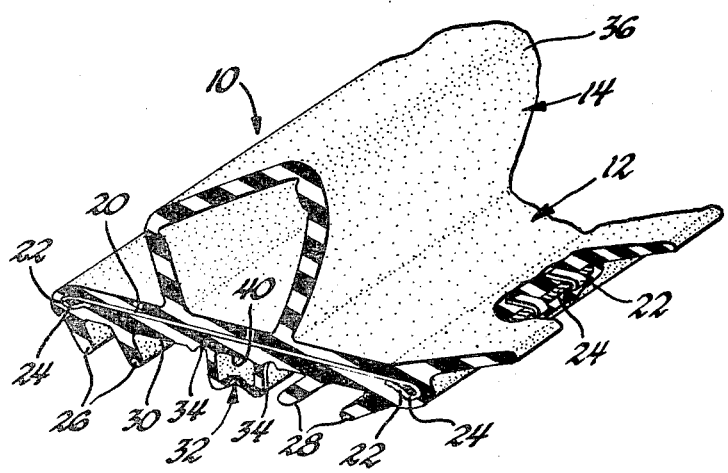
FIG. 2 is a cross-sectional perspective view of the weatherstrip invention in its originally formed configuration.

Referring now to FIG. 2, it may be noted that the weatherstrip 10 is initially formed to include spaced flat metal strips 20, each having the ends 22 thereof rolled or crimped around a cord 24, the latter serving to interconnect the metal strips in the form of a rope ladder in a spaced relationship in the usual manner. The metal strips 20 and the interconnecting cords 24 are surrounded as a result of a conventional extrusion operation by a uniform layer of hard or high density elastomeric material, with the usual two pairs of stiff retention lips 26 and 28 formed at predetermined angles adjacent the ends on one side surface 30 thereof.

In the same operation a flange sealing bulb 32 is integrally extruded in a predetermined peripheral shape, such as the "W" shape shown in the drawings, along the center portion of the side surface 30, intermediate the two pairs of retention lips 26 and 28. A notch 34 is formed in the surface 30 adjacent each end of the bulb 32.

The deflection portion 14 is extruded of a soft or low density elastomeric material concurrently with the retention portion 12 in the same extrusion operation. It may assume any desired shape, such as the hollow bulb-like or tubular member 36 shown in the Figures.

Figure 3:
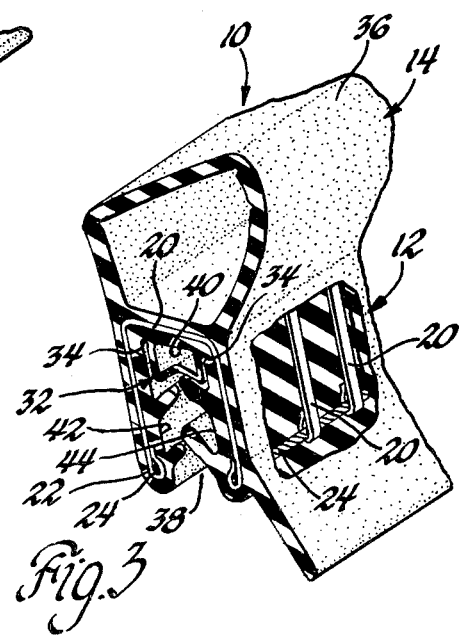
FIG. 3 is a fragmentary perspective view of the weatherstrip invention in its "ready-to-be-assembled" configuration.

As seen in FIG. 3, the retention portion 12 is roll formed from the initially formed flat or open configuration of FIG. 2 into a "U"-shaped recess 38 having an end wall 40 and oppositely disposed side walls 42 and 44. The high density elastomeric material and the metal strips 20 bend about each of the spaced notches 34 such that the two side walls 42 and 44 extend past the sides of the flange sealing bulb 32, the latter now being spaced inwardly from the retention lips 26 and 28, the "W"-shape not being essential to the invention but, rather, being formed as such in order to cooperate with the location of the adjacent retention lip 28. As will be recognized by those skilled in the art, the flange sealing bulb 32 substantially fills the space heretofor selectively filled with a butyl mastic or other sealant applied as a bead along the bottom or end wall 40 of the recess 38 for insertion thereinto of the edge 46 of the body flange portion 16, when the weatherstrip is installed on such flange portion 16.

In their free state, each of the two pairs of retention lips 26 and 28 extend to the center of the U-shaped recess 38, angling toward the end wall 40 of the recess at their predetermined angle with the former surface 30, now the inner surfaces or side walls 42 and 44 of the recess. As a result, the retention lips are spread as the weatherstrip 10 is forced over the body flange portion 16, thereby exerting a pressure, along with the crimped metal strips 20, on the opposite faces of the flange portion sufficient to retain the weatherstrip 10 in place (FIG. 1). When installed, the edge 46 of the body flange portion 16 depresses the hollow flange sealing bulb 32 along the entire length thereof toward the end wall 40, as represented in cross-section in FIG. 1, the bulb 32 thereby effectively and substantially uniformly sealing the outside surface from the inside surface of the body flange portion 16.

It should now be apparent that the invention provides an improved pinchweld weatherstrip wherein, in one extrusion process, an effective flange sealing bulb is integrally formed thereon, eliminating the need for a separately applied bead of butyl mastic sealant for sealing around a vehicle body closure structure.

While but one embodiment of the invention has been shown and described, other modifications thereof are possible.

What is claimed is:

1. In a vehicular closure opening and a cooperating body flange, a weatherstrip comprising an extruded retention member adapted to being mounted on the body flange and including equally spaced laterally extending metal strips formed therein and crimped into a U-shaped configuration to form a recess having an end wall and a pair of oppositely disposed side walls, and having a predetermined width for receiving the body flange, a pair of retention lips formed on each side wall of the recess and extending toward the center of the recess to exert a pressure on the body flange to retain the weatherstrip in place thereon, and a hollow, flexible flange sealing bulb integral with and extending from the end wall of the recess, with a width greater than the thickness of the body flange and spaced inwardly from the retention lips, said sealing blub adapted to being substantially uniformly depressed toward the end wall of the recess along its entire length by the abutment of the body flange against the center of the sealing bulb to thereby prevent leakage past the flange.

* * * * *